United States Patent Office 3,763,159
Patented Oct. 2, 1973

3,763,159
TRIAZINYL-ANTHRAQUINONE DYES
Trevor James Smith, Manchester, England, assignor to Imperial Chemical Industries Limited, London, England
No Drawing. Filed Sept. 24, 1971, Ser. No. 183,637
Claims priority, application Great Britain, Oct. 15, 1970, 49,061/70
Int. Cl. C07d 55/46
U.S. Cl. 260—249                   1 Claim

ABSTRACT OF THE DISCLOSURE

Water-soluble reactive dyes for wool prepared by the condensation of 1-amino - 2 - sulpho-4-(aminoanilino) anthraquinone with cyanuric chloride (or similar triazine or pyrimidine compound) and a substituted phenol or thiophenol wherein the substituent is a hydrocarbyl radical (other than methyl) attached by direct link or O or S bridge.

---

This invention relates to anthraquinone dyes, their preparation and their application to textile materials.

According to the invention there are provided water-soluble anthraquinone dyes having the general formula:

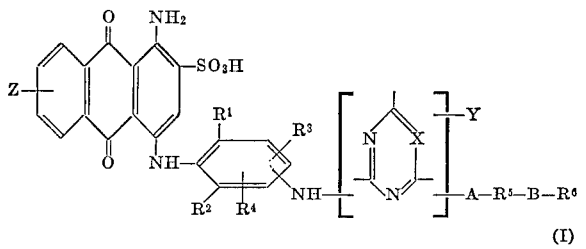

(I)

wherein $R^1$ represents alkyl, $R^2$ represents halogen or alkyl, $R^3$ represents hydrogen or alkyl, $R^4$ represents hydrogen, alkyl or sulphonic acid, Z represents hydrogen or sulphonic acid, Y represents chlorine or bromine, X represents

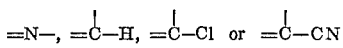

A represents oxygen or sulphur, $R^5$ represents arylene optionally carrying one or more halogen, alkyl or alkoxy substituents, B represents oxygen, sulphur, or a direct link and $R^6$ represents optionally substituted alkyl, which may be branched or straight chain, having from 2 to 18 carbon atoms, cycloalkyl, aralkyl or aryl.

In the class of dyes represented by Formula I it is generally preferred that when $R^6$ represents an alkyl residue, this residue should contain from 4 to 12 carbon atoms.

A particularly preferred class of dyes falling within the general scope of Formula I may be represented by the general formula:

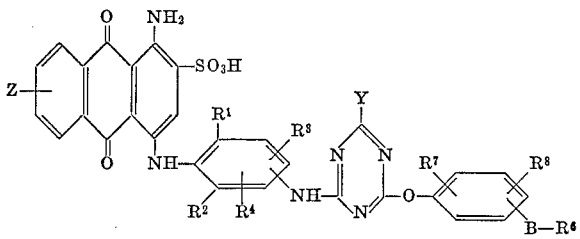

wherein Z, Y, B and $R^6$ have the meanings already stated, $R^1$ and $R^2$ are each methyl or ethyl, $R^3$ is hydrogen, methyl or ethyl, $R^4$ is hydrogen, methyl, ethyl or sulphonic acid and $R^7$ and $R^8$ are each hydrogen, halogen, alkyl or alkoxy. Within this class it is especially preferred that Z is hydrogen and $R^4$ is sulphonic acid.

The dyes of Formula I may be prepared by reacting a compound of the formula:

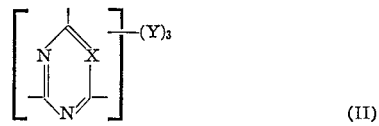

(II)

wherein X and Y have the meanings already stated, with, in either order, equimolecular proportions of an anthraquinone derivative for the formula:

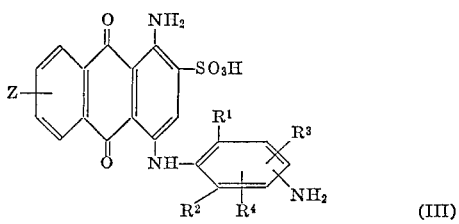

(III)

wherein $R^1$, $R^2$, $R^3$, $R^4$ and Z have the meanings already stated and a compound of the formula:

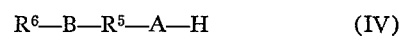

(IV)

wherein $R^5$, $R^6$, A and B have the meanings already stated.

Suitable compounds of Formula II are cyanuric chloride, cyanuric bromide, 2,4,6-trichloropyrimidine, 2,4,6-tribromopyrimidine, 2,4,5,6-tetrachloropyrimidine and 2,4,6-trichloro-5-cyanopyrimidine. Suitable compounds of Formula III which are well known in the anthraquinone dye field and may be prepared by known methods are 1-amino-4-(3'-amino-2',4',6'-trimethylphenylamino) anthraquinone 2,5'-disulphonic acid,
1-amino-4-(3'-amino-2',4',6'-triethylphenylamino) anthraquinone-2,5'-disulphonic acid,
1-amino-4-(4'-amino-2',3',6'-trimethylphenylamino) anthraquinone-2,5'-disulphonic acid,
1-amino-4-(4'-amino-2',6'-dimethylphenylamino) anthraquinone-2,5'-disulphonic acid,
1-amino-4-(4'-amino-2',6'-diethylphenylamino) anthraquinone-2,5'-disulphonic acid,
1-amino-4-(4'-amino-2'-bromo-6'-methylphenylamino) anthraquinone-2,5-disulphonic acid, and
1-amino-4-(4'-amino-2',3',5',6'-tetramethylphenyl-amino)anthraquinone-2,5-disulphonic acid.

Suitable compounds of Formula IV include alkylphenols, for example o-, m-, and p-ethylphenols, o-, m-, and p-butylphenols, amylphenols, hexylphenols, p-octylphenol, p-nonylphenol, p - dodecylphenol, m - pentadecylphenol, p-hexadecylphenol, and p - octadecylphenol; cycloalkylphenols, for example o- and p-cyclohexylphenols; aralkylphenols, for example o-, m- and p-benzylphenols; arylphenols, for example o-, m-, and p-phenylphenols; alkoxyphenols, for example hydroquinone and resorcinol monoalkyl ethers where the alkyl residue may be ethyl, propyl, butyl, amyl, hexyl, heptyl, octyl, nonyl, decyl, and dodecyl; cycloalkoxyphenols, for example p-cyclohexyloxyphenol, aralkoxyphenols, for example p-benzyloxyphenol; aryloxyphenols, for example p-phenoxyphenol; thio-substituted phenols, for example o-, m-, and p-(butylthio) phenols, o- and m-(hexylthio)phenols, o-(heptylthio) phenol, p-(dodecylthio)phenol, o- and p-(benzylthio)phenols, o-, m-, and p-(phenylthio)phenols; benzenethiols, for example p-butylbenzenethiol, p-butoxybenzenethiol, p-(butylthio)benzenethiol, p-amylbenzenethiol, p-hexylbenzenethiol, p-hexyloxybenzenethiol, p - octylbenzenethiol, p-nonylbenzenethiol, p-decylbenzenethiol, p-dodecylbenzenethiol, p-biphenylenethiol, and m-(phenylthio)benzenethiol. Suitable compounds of Formula IV wherein $R^5$ may carry one or more halogen, alkyl, or alkoxy substituents in addition to the —B—$R_6$ residue include 4-n-butyl-2-methylphenol, 4-sec-butyl-2-methylphenol, 3-iso-butyl-5-methylphenol, 4-n-butyl - 2 - methoxyphenol, 4-n-butyl-2-chlorophenol, 4-chloro-2-ethylphenol, 2,4- and 2,6-dipropylphenols, 2,4- and 2,6-di-tert-butylphenols, 2,6-di-tert-butyl-4-ethylphenol, 2,6-di-tert-butyl-4-chlorophenol, 2,6-di-tert-butyl-4-methoxyphenol, 4-tert-butyl-2, 6-dimethylphenol, 4-tert-butyl-2,5-dimethylphenol, 4-tert-amyl-2-methoxyphenol, 2-chloro-4-octylphenol. The reactions leading to the formation of dyes of Formula I may be carried out using conditions that have been fully described in the prior art for such reactions. The dyes are usually isolated and used in the form of their water-soluble salts, particularly sodium salts.

The dyes of the present invention may be used for colouring cellulosic textile materials using methods that have been fully described in the prior art for the application of monohalogenotriazinyl and halogenopyrimidinyl dyes. They are particularly useful, however, for colouring textile materials based on natural or synthetic nitrogenous fibres.

The dyes are especially suitable for dyeing wool including wool which has been rendered non-felting or machine-washable by chemical processes such as acid chlorination, the use of hypochlorite under neutral or slightly alkaline conditions, the use of permonosulphuric acid, the use of the sodium salt of dichloroisocyanuric acid, and by the deposition of polymers on the surface of the wool using for example amine-epichlorohydrin resins. Material which has been so treated may be dyed by conventional wool dyeing methods, by the use of pad-batch dyeing methods, and also by continuous pad-steam processes. When applied to such fibres, the dyes have excellent affinity and produce brilliant blue shades of excellent fastness to wet treatments and to light.

The invention is illustrated but not limited by the following examples in which all parts are by weight.

EXAMPLE 1

A neutral solution of 10.6 parts of 1-amino-4-(3'-amino-2',4',6' - trimethylphenylamino)anthraquinone - 2,5' - disulphonic acid in 200 parts of water is added during 15 minutes to a stirred suspension of 4.4 parts of cyanuric chloride in a mixture of 36 parts of acetone and 200 parts of water at 0–5° C. The pH of the mixture is maintained between 4.5 and 5.0 by adding a 2 N solution of sodium carbonate as necessary and the stirring is continued for 1 hour. The reaction mixture is filtered and is then added slowly during 30 minutes to a stirred solution of 3.3 parts of p-tert-butylphenol in a mixture of 50 parts of acetone and 100 parts of water at 30° C., which has been adjusted to a pH between 8.5 and 9.0 by the addition of a 2 N solution of sodium hydroxide. The pH of the reaction mixture is maintained between 8.5 and 9.0 during the addition. The reaction mixture is stirred under these conditions during a further 3 hours and then the pH is adjusted to between 6.5 and 7.0. The solution is treated with 10% weight/volume of sodium chloride and the precipitated dyestuff is filtered off, washed with a solution containing 10% weight/volume of sodium chloride, and dried at room temperature.

The dyestuff so obtained dyes wool from a weakly acidic dyebath in brilliant reddish blue shades possessing excellent fastness to wet treatments and to light.

EXAMPLE 2

A neutral solution of 10.6 parts of 1-amino-4-(3'-amino-2',4',6' - trimethylphenylamino)anthraquinone - 2,5' - disulphonic acid in 200 parts of water is reacted with 4.4 parts of cyanuric chloride suspended in a mixture of 36 parts of acetone and 200 parts of water at 0–5° C. as described in Example 1. The filtered solution is added slowly during 30 minutes to a stirred solution of 4.84 parts of p-nonylphenol in a mixture of 50 parts of acetone and 100 parts of water at 30° C., which has been adjusted to a pH between 8.5 and 9.0 by the addition of a 2 N solution of sodium hydroxide. The pH of the reaction mixture is maintained between 8.5 and 9.0 during the addition. The reaction mixture is then warmed to 40° C. and is stirred at 40° C. and pH between 8.5 and 9.0 during 5 hours. The pH of the solution is adjusted to 8.0 and 10% weight/volume of sodium chloride is added. The precipitated dyestuff is filtered off, washed on the filter with a solution containing 10% weight/volume of sodium chloride, and dried at room temperature.

The dyestuff so obtained dyes wool from a weakly acidic dyebath in brilliant reddish blue shades possessing excellent fastness to wet treatments and to light.

EXAMPLE 3

A neutral solution of 5.3 parts of 1-amino-4-(3'-amino-2',4',6' - trimethylphenylamino)anthraquinone - 2,5' - disulphonic acid in 200 parts of water is added during 30 minutes to a stirred suspension of 3.1 parts of 2-p-tert-butylphenoxy-4,6-dichloro - s - triazine in a mixture of 100 parts of acetone and 100 parts of water at 0–5° C. The pH of the mixture is maintained between 6.5 and 7.0 by the addition of a 2 N solution of sodium carbonate as necessary. The reaction mixture is warmed to 30–35° C. and is stirred under these conditions at a pH between 6.5 and 7.0 during 4 hours. The solution is filtered and the filtrates are treated at room temperature with 10% weight/volume of sodium chloride. The precipitated dyestuff is filtered off, washed with a solution containing 10% weight/volume of sodium chloride, and dried at room temperature.

The dyestuff so obtained has identical properties to the dyestuff obtained by the method of Example 1.

Further examples of the invention are given in the table below. These dyes are prepared by the methods of Examples 1 to 3, and have the general formula:

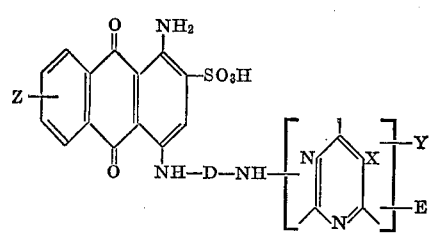

where Z, D, E, X and Y have the meanings given in the table.

TABLE

| Ex. No. | Z | D | E | X | Y |
|---|---|---|---|---|---|
| 4 | H | 2,4,6-trimethyl-3-SO₃H-phenyl (CH₃ at 2,4,6; SO₃H at 3) | −O−C₆H₄−C₂H₅ | N | Cl |
| 5 | H | Same as above | −O−C₆H₄−C(CH₃)₂C₂H₅ | N | Cl |
| 6 | H | ....do.... | −O−C₆H₄−(CH₂)₇CH₃ | N | Cl |
| 7 | H | ....do.... | −O−C₆H₄−(CH₂)₁₁CH₃ | N | Cl |
| 8 | H | ....do.... | −O−C₆H₄−(CH₂)₁₄CH₃ | N | Cl |
| 9 | H | ....do.... | −O−C₆H₄−C₆H₁₁ (H) | N | Cl |
| 10 | H | ....do.... | −O−C₆H₄−CH₂−C₆H₅ | N | Cl |
| 11 | H | ....do.... | −O−C₆H₄−C₆H₅ | N | Cl |
| 12 | H | ....do.... | −O−C₆H₄−OC(CH₃)₃ | N | Cl |
| 13 | H | ....do.... | −O−C₆H₄−O(CH₂)₇CH₃ | N | Cl |
| 14 | H | ....do.... | −O−C₆H₄−O(CH₂)₁₁CH₃ | N | Cl |
| 15 | H | ....do.... | −O−C₆H₄−O−C₆H₁₁ (H) | N | Cl |
| 16 | H | ....do.... | −O−C₆H₄−OCH₃ (with phenyl) | N | Cl |
| 17 | H | ....do.... | −O−C₆H₄−O−C₆H₅ | N | Cl |
| 18 | H | ....do.... | −S−C₆H₄−C(CH₃)₃ | N | Cl |
| 19 | H | ....do.... | −S−C₆H₄−(CH₂)₁₁CH₃ | N | Cl |
| 20 | H | ....do.... | −S−C₆H₄−OC(CH₃)₃ | N | Cl |
| 21 | H | ....do.... | −S−C₆H₄−SC(CH₃)₃ | N | Cl |
| 22 | H | ....do.... | −S−C₆H₄−(CH₂)₅CH₃ | N | Cl |
| 23 | H | ....do.... | −O−C₆H₃(CH₃)−(CH₂)₃CH₃ | N | Cl |
| 24 | H | ....do.... | −O−C₆H₃(OCH₃)−(CH₂)₃CH₃ | N | Cl |
| 25 | H | ....do.... | −O−C₆H₃(Cl)−(CH₂)₃CH₃ | N | Cl |

TABLE—Continued

| Ex. No. | Z | D | E | X | Y |
|---|---|---|---|---|---|
| 26 | H | 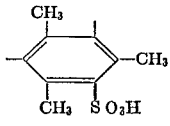 | 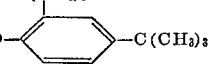 | N | Cl |
| 27 | ⅝-SO₃Hᵃ | 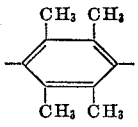 | —O—⟨⟩—C(CH₃)₃ | N | Cl |
| 28 | ⅝-SO₃Hᵃ | 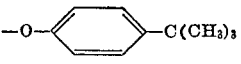 | —O—⟨⟩—(CH₂)₈CH₃ | N | Cl |
| 29 | ⅝-SO₃Hᵃ | 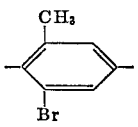 | Same as above | N | Cl |
| 30 | ⅝-SO₃Hᵃ | 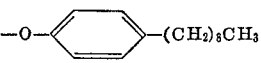 | do | N | Cl |
| 31 | ⅝-SO₃Hᵃ | 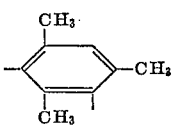 | do | N | Cl |
| 32 | ⅝-SO₃Hᵃ | Same as above | —O—⟨⟩—C(CH₃)₃ | N | Cl |
| 33 | ⅝-SO₃Hᵃ | 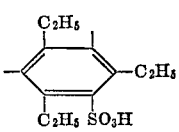 | Same as above | N | Cl |
| 34 | ⅝-SO₃Hᵃ | Same as above | —O—⟨⟩—(CH₂)₈CH₃ | N | Cl |
| 35 | ⅝-SO₃Hᵃ | 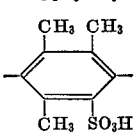 | Same as above | N | Cl |
| 36 | H | 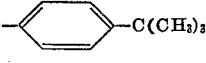 | do | C-H | Cl |
| 37 | H | Same as above | —O—⟨⟩—C(CH₃)₃ | C-H | Cl |
| 38 | H | do | —O—⟨⟩—(CH₂)₈CH₃ | N | Br |
| 39 | H | do | Same as above | C-CN | Cl |
| 40 | H | 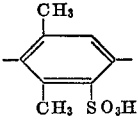 | —O—⟨⟩—(CH₂)₈CH₃ | C-Cl | Cl |
| 41 | H | Same as above | 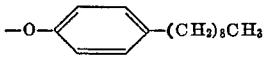 | N | Cl |

ᵃ Mixed isomers.

Examples 4 to 26 and 30 to 41 give reddish-blue and Examples 27 to 29 mid-blue shades on wool with excellent fastness to wet treatments and to light.

I claim:

1. A water-soluble anthraquinone dye having the formula:

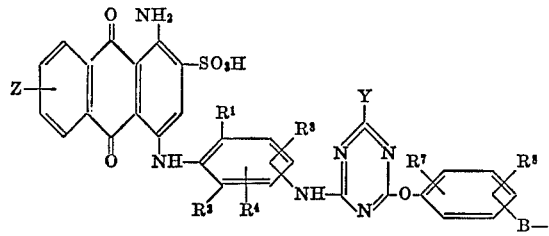

wherein each of $R^1$ and $R^2$ is methyl or ethyl, $R^3$ is hydrogen, methyl or ethyl, $R^4$ is hydrogen, methyl, ethyl or sulphonic acid, each of $R^7$ and $R^8$ is hydrogen, halogen, lower alkyl or lower alkoxy; Z represents hydrogen or sulphonic acid, Y represents chlorine or bromine, B represents oxygen, sulphur or a direct link, and $R^6$ represents branched or straight chain alkyl having 2–15 carbon atoms, cyclohexyl, benzyl or phenyl.

References Cited
UNITED STATES PATENTS

| 3,214,445 | 10/1965 | Hindermann et al. | 260—249 X |
| 3,397,207 | 8/1968 | Barben et al. | 260—249 |

JOHN M. FORD, Primary Examiner

U.S. Cl. X.R.

260—256.5; 8—54.2, 1 E